United States Patent [19]

Thompson

[11] Patent Number: 5,037,174

[45] Date of Patent: Aug. 6, 1991

[54] OPTICAL FIBER HAVING AN ASPHERICAL LENS THEREON AND METHOD OF MAKING SAME

[75] Inventor: David R. Thompson, New Castle, Del.

[73] Assignee: E. I. Du Pont de Nemours and Company, Wilmington, Del.

[21] Appl. No.: 472,995

[22] Filed: Jan. 31, 1990

[51] Int. Cl.[5] ........................ G02B 6/32; C03B 11/08
[52] U.S. Cl. ...................................... 385/33; 65/10.2; 65/12; 65/37
[58] Field of Search ............... 350/96.15, 96.17, 96.18, 350/96.20, 96.29, 320; 65/2, 10.2, 12, 37, 39

[56] References Cited

U.S. PATENT DOCUMENTS

| | | | |
|---|---|---|---|
| 3,910,677 | 10/1975 | Becker et al. | 350/96.18 X |
| 4,243,399 | 1/1981 | Khoe et al. | 65/4 B |
| 4,490,020 | 12/1984 | Sakaguchi et al. | 350/96.18 |
| 4,565,558 | 1/1986 | Keil et al. | 65/1 |
| 4,589,897 | 5/1986 | Mathyssek et al. | 65/2 |
| 4,730,021 | 1/1983 | Khoe et al. | 350/96.18 |

FOREIGN PATENT DOCUMENTS 3134508 3/1983 Fed. Rep. of Germany ... 350/96.18 X

OTHER PUBLICATIONS

Khoe et al., "Efficient Coupling of Laser Diodes ... " Elect. Lett. 3/83 vol. 19 No. 6 pp. 205-206.
Keil et al., "Experimental Investigation of the Beam Spot ... " Elect. Lett. 7/84 vol. 20 No. 15 pp. 621-622.
Kuwahara et al., "Efficient Coupling from Semiconductor Lasers ... " Applied Optics vol. 19 No. 15 8/80 pp. 2578-2583.
D'Auria et al., "High Index Microlenses for GaAlAs ... " Elect. Lett. 4/80 vol. 16 No. 9 pp. 322-324.
Wolfgang Bludau and Rolf H. Rossberg, Low-Loss Laser-to -Fiber Coupling with Negligible Optical Feedback, Journal of Lightware Technology, vol. LT-3, No. 2, Apr. 1985 pp. 294-302.

Primary Examiner—Brian Healy

[57] ABSTRACT

An optical fiber having an axis therethrough and having a tip thereon comprising a first tapered region and a second adjacent tapered region. The second tapered region terminates in an aspherical lens. Each of the tapered regions having a surface thereon. The surface of the first tapered region defines an angle with respect to the axis of the fiber that lies in the range from about ten (10) to about thirty (30) degrees, while the surface of the second tapered region defining an angle with respect to the axis of the fiber that lies in the range from about thirty-five (35) to about sixty (60) degrees. The second tapered region is produced as a result of a jerking action imposed during the drawing of the fiber.

10 Claims, 4 Drawing Sheets

OPTICAL FIBER HAVING AN ASPHERICAL LENS THEREON AND METHOD OF MAKING SAME

BACKGROUND OF THE INVENTION

1. Field Of The Invention

This invention relates to an optical fiber having an aspherical lens at the tip thereof and to a method of making the same.

2. Description Of The Prior Art

An optical communication system includes a source of light energy and an associated receiver connected over an optical fiber waveguide. The measure of the power coupled from the source into the fiber or from the fiber to the receiver is termed coupling efficiency.

The typical optical fiber has a core approximately nine (9) micrometers in diameter, the core being formed of a material that exhibits a first predetermined index of refraction. The core is surrounded by an outer layer of a cladding material that exhibits a second predetermined index of refraction. The overall outer diameter of the typical optical fiber is on the order of one hundred twenty five (125) micrometers.

The optical fiber usually has a lensed end at its tip. The lensed end is typically spherical, although it is known that the lensed end may be aspherical in shape.

Although a spherical lens is easy to produce and is generally sufficient to the meet the needs of the system in which it is placed, a spherical lens is subject to spherical aberration. Such spherical aberration lowers coupling efficiency and thus renders such a fiber less preferred for low loss, high gain uses, such as laser optical amplifiers.

It has been recognized that an aspherical lens reduces spherical aberration and improves coupling efficiency for any sized lens. However, an aspherical lens does not appear to be widely used on optical fiber waveguides, perhaps because of a perceived difficulty in manufacturing the same.

U.S. Pat. No. 4,565,558 (Keil et al.) and U.S. Pat. No. 4,589,897 (Mathyssek et al.) both relate to the formation of a spherical or aspherical lensed end on an optical fiber. The apparatus disclosed in these patents utilizes two clamps, at least one of which moves relatively to the other while an electric arc heats a portion of the fiber between the clamps. As a constriction appears as the result of constant tension and heat, the tension is dropped and a further constriction occurs leading to a separation which solidifies when the heat is cut off to form a lens on a tapered fiber.

Blaudau and Rossberg, Journal of Lightwave Technology, Vol. LT-3, No. 3, April 1985 teach making an aspherical lens by first forming a bulbous spherical lens on a fiber and then welding a cylinder of pure quartz at the center of the bulb. Upon remelting the pure quartz flows out to form an aspherical surface.

U.S. Pat. Nos. 4,243,349 and 4,370,021 (both to Khoe et al.) teach flattening the end of an optical fiber to produce a semi-elipsoidal lens.

SUMMARY OF THE INVENTION

The present invention relates to an optical fiber waveguide with a tip having two tapered regions thereon. The first tapered region is disposed adjacent to the full diameter of the fiber and is characterized as being shallow in slope with respect to the axis of the fiber. Defined more precisely an extension of a line lying on the surface of the first tapered region intersects with the axis of the fiber at an angle in the range from ten (10) to thirty (30) degrees. Preferably, the angle is about eighteen (18) degrees.

A second, more steeply tapered region is disposed immediately adjacent to the first tapered region. The second region is characterized in that an extension of a line lying on the surface thereof intersects with the axis of the fiber at an angle in the range from thirty-five (35) to sixty (60) degrees. Preferably, the angle is about of forty five (45) degrees. The second, more steeply tapered region terminates in an aspherical lens. The lens is preferably substantially hyperbolic in section.

The present invention also relates to a method for making an optical fiber waveguide having a tip of the above described structure. The method includes the steps of positively clamping a length of an optical fiber at first and second spaced clamping points and directing an energy arc at a predetermined separation point on the fiber intermediate the first and second clamping points. The arc has a temperature sufficient to soften the fiber above its transition temperature. There is thus defined with respect to the separation point a first and a second portion on the fiber. At least one of the clamps is relatively moved with respect to the other clamp at a first predetermined separation acceleration in the presence of the energy arc thereby to define a first tapered region on at least one portion of the fiber. The separation acceleration is stepwise increased to jerk apart the fiber and separate the first and second portions at the separation point. This action forms a nipple-like extension on at least the portion of the fiber having the first tapered region. The portion of the fiber having the nipple-like extension thereon is cooled below the transition temperature to solidify the extension. Thereafter the solidified nipple-like extension is introduced into the arc. The nipple-like extension is heated more quickly than the remainder of the tip and, owing to surface tension effects, the nipple-like extension withdraws and contracts to form into the second tapered region having an aspherical lensed end. The more pronounced slope of the second tapered region is formed as a result of the jerked separation of the fiber into the first and second portions.

BRIEF DESCRIPTION OF THE DRAWINGS

The invention will be more fully understood from the following detailed description thereof, taken in connection with the accompanying drawings, which form a part of this application, and in which.

DETAILED DESCRIPTION OF THE INVENTION

Figure 1:
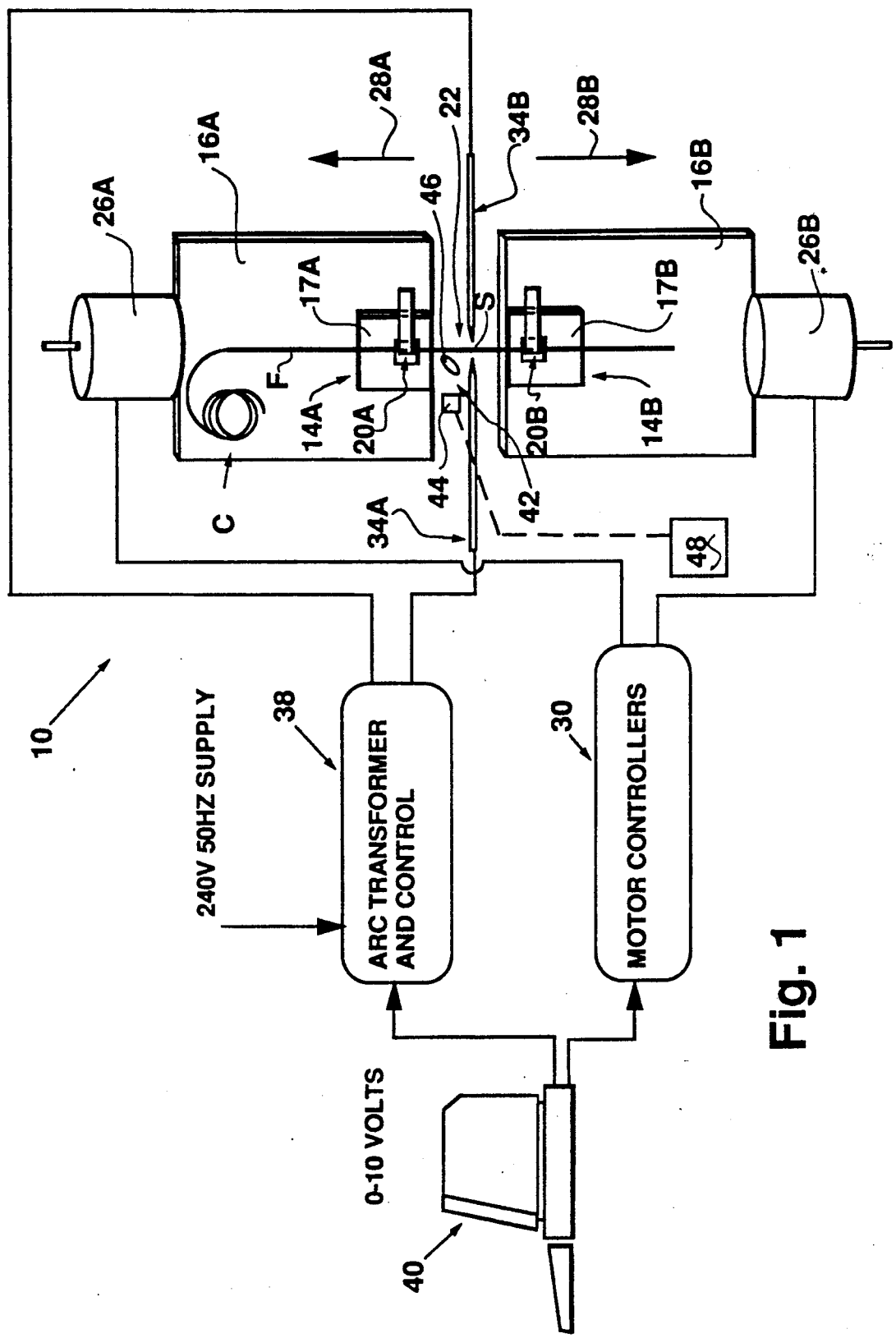
FIG. 1 is a highly stylized pictorial representation of an apparatus for implementing the method of forming an optical fiber having an aspherical lens in accordance with the present invention.

Throughout the following detailed description similar reference numerals refer to similar elements in all figures of the drawings.

FIG. 1 is a is a highly stylized pictorial representation of an apparatus generally indicated by the reference character 10 for implementing the method of forming an optical fiber having an aspherical lens in accordance with the present invention. The apparatus 10 includes a first and a second fiber clamp 14A, 14B each of which is mounted on a respective stage 16A, 16B. As will be discussed each clamp 14A, 14B is operative to positively clamp a predetermined length of an optical fiber F at respective first and second clamp points 20A, 20B. The clamp points 20A, 20B are spaced apart to define a draw zone generally indicated by the reference character 22.

The clamps 14A, 14B are preferably implemented using a grooved platform 17A, 17B in which the fiber is laid. The fiber is positively held in place so as to preclude slippage by an overcenter clamp. Each of the stages 16A, 16B may be implemented using a linear stage device such as that available from Klinger Scientific of Garden City, N.Y. as the Klinger model UT 100.25 linear stage.

Each stage 16A, 16B has a respective drive motor 26A, 26B suitably secured thereto. The drive motors 26A, 26B are operative to translate each stage 16A, 16B along a respective path of travel, indicated in FIGS. 1 and 2 by the respective reference character 28A, 28B. Each motor 26A, 26B is controlled by a suitable motor controller, collectively indicated by the reference character 30. It should be noted that although in the preferred embodiment being described both of the stages may be translated, it lies within the contemplation of the invention to fix (or, at least not move) a given one of the stages, or to utilize any other expeditious arrangement so long as one of the stages is relatively movable with respect to the other at some predetermined acceleration.

Suitable for use as the drive motor 26A, 26B is the stepper motor available from the Compumotor Division of Parker Hannifin Corp, Petaluma, Calif. as Compumotor A57-83. The motor controllers 30 may be implemented using the controllers available from the same source as Compumotor A57-83 controllers.

Disposed in the draw zone 22 is a pair of arcing electrodes 34A, 34B. The electrodes 34A, 34B are each connected to a suitable arc transformer and controller, collectively indicated in FIG. 1 by the reference character 38. Suitable for use for this purpose is the device available from Action Instruments Inc., San Diego, Calif. Each arc transformer and controller 38A, 38B includes a step-up transformer, an AP3231 Phase Angle Controller and an AP3010 Inductive Load Driver. The transformer steps up a 240 volt 50 Hz power input to 5000 volts while the phase angle controller and the driver function as a sine wave chopper on the power output from the transformer.

Overall system control is effected using a suitable programmable control device 40, such as an IBM Industrial AT (operating on DO 3.1) which is obtainable from International Business Machines Corp. Manufacturing Systems Products in Boca Raton, Fla. The computer 40 is equipped with two Compumotor PC 21 cards and a Data Translation twelve-bit D/A card. The latter is obtained from Data Translation, Marlboro, Mass.

The apparatus 10 also includes a visual monitoring system generally indicated by the reference character 42 for viewing the region of the draw zone 22 in the vicinity of the separation point S on the fiber F. The visual monitoring system 42 includes a suitable camera 44 and associated optics 46 (to provide the desired level of magnification) whereby a real time picture of the lens formation may be viewed by the operator at a monitor 48. The vicinity of the separation point S in the lens forming area of the draw zone 22 should be backlit with colluminated white light.

To form an aspherical lens on the tip of an optical fiber F, the jacket and buffer coating of a predetermined length of the fiber F is stripped and cleaned. The fiber F is clamped by the clamps 14A, 14B at the respective clamp points 20A, 20B so that a length of the cleaned and stripped fiber traverses the draw zone 22. The remaining length of the fiber F still covered with the jacket and buffer coating is held out of the way, as represented by the coiled length C shown in FIG. 1. In the Figures that follow herein the upper member is to be understood as part of this remaining coiled length of fiber. The lower member in the Figures defines a stub length of fiber that is usually discarded.

A predetermined point S on the fiber F in the draw zone 22 lies between the electrodes 34A, 34B. The point S, as will be developed, defines a separation point at which a first and a second portion of a separated fiber will be defined.

Figure 2:
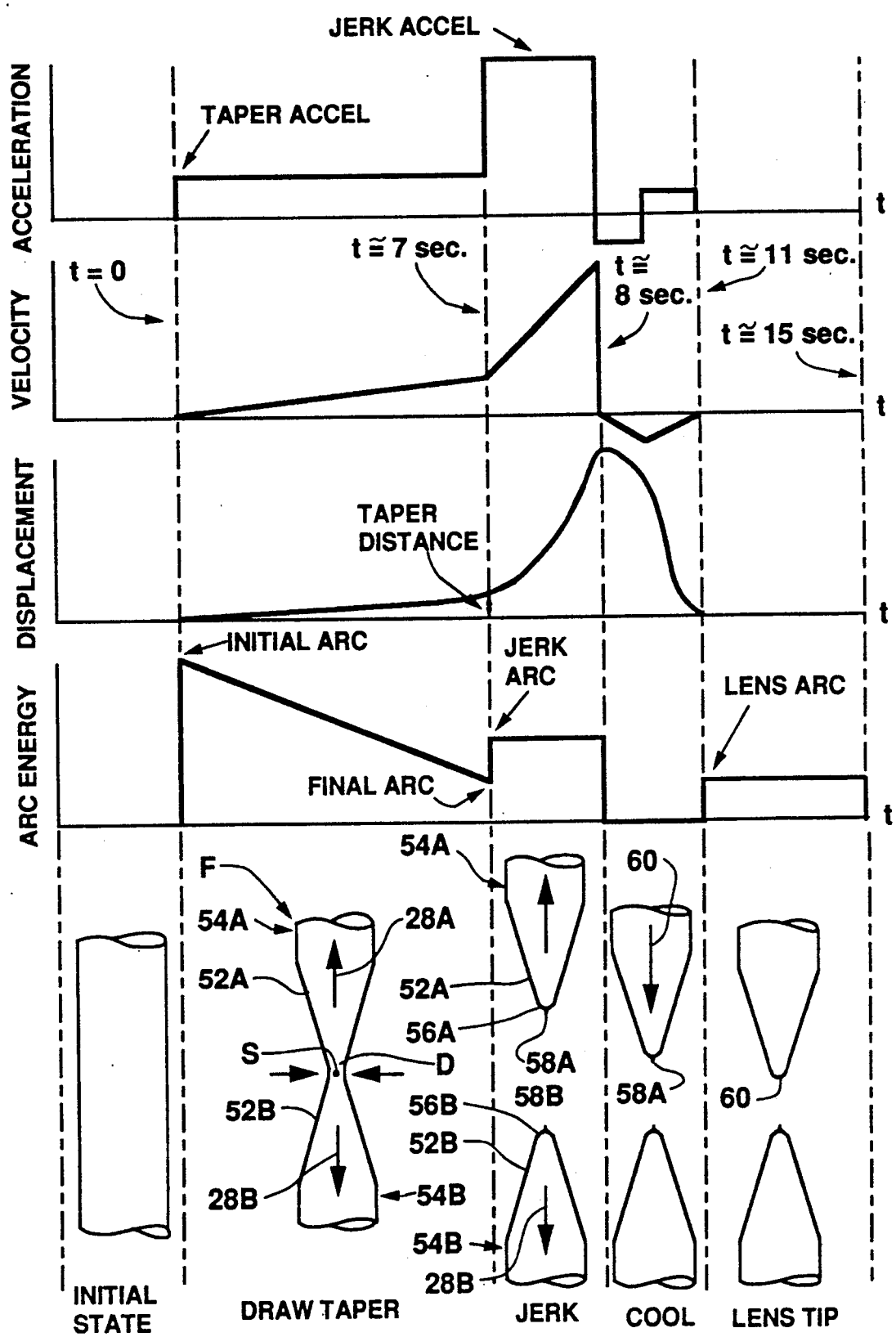
FIG. 2 is a timing diagram of the state of various parameters of the formation process and illustrations of the profile of an optical fiber being formed at various predetermined times during the practice of the process in accordance with the present invention.

The steps of the method in accordance with the present invention may be understood from FIG. 2. This Figure is a timing diagram of the state of various parameters of the formation process and illustrations of the profile of the tip an optical fiber being formed at various predetermined times during the practice of the process in accordance with the present invention. In FIG. 2 the relative acceleration, velocity, and displacement of the clamps 14A, 14B and the energy of the arc established between the electrodes 34A, 34B are indicated as a function of time. Moreover, the FIG. 2 illustrates the physical changes undergone by the length of the fiber F about the point S within the draw zone 22.

At the initiation of the process an arc is produced across the electrodes 34A, 34B under the control of the computer 40. The arc interacts with the fiber in the draw zone at the separation point S. The arc energy is controlled throughout the process so that the energy of the arc: ranges from an initial arc energy value to a final arc energy value during drawing of the fiber; thereafter jumps to a jerking arc energy value; and is later reduced to exhibit a predetermined lensing arc energy, all as will be explained. A predetermined "bit count" (a measure used in the Table that follows herein) in the range from 0 to 4095 from the computer 40 corresponds to a 0 to 10 volt output to the controller 38 and produces a corresponding 0 to 50 mA current to the electrodes 34A, 34B. The current to the electrodes governs the arc energy level.

Figure 4:
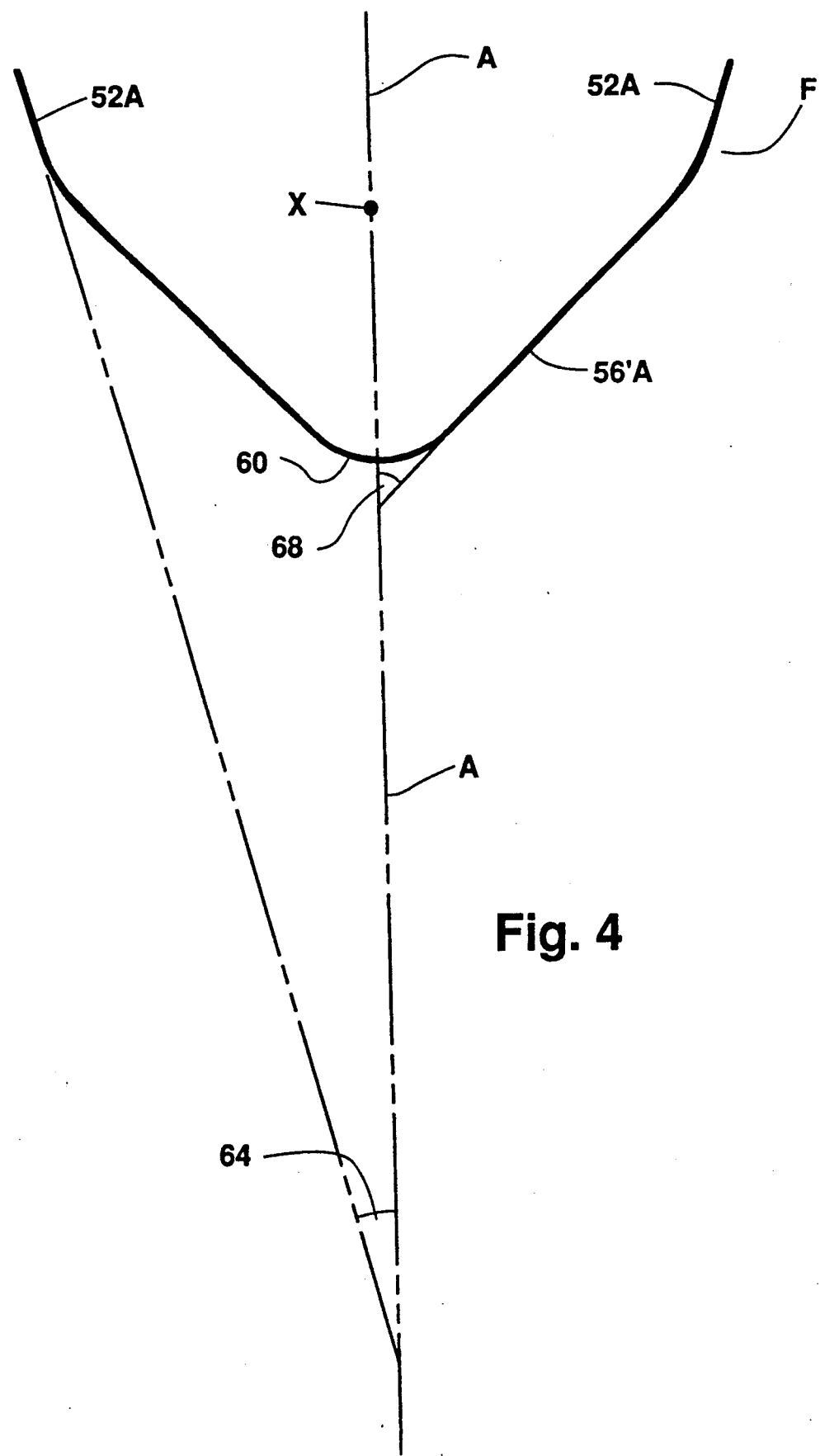
FIG. 4 is an enlarged profile view of the tip of an optical fiber having an aspherical lens thereon formed in accordance with the present invention.

At the start of the process the clamps 14A, 14B are relatively moved away from each other at a predetermined constant taper acceleration. This drawing action defines a long, relatively shallow slope taper 52A, 52B on each portion of the fiber F above and below the separation point S. As will be explained, the slope of the taper is defined with respect to the axis A of the fiber F (FIG. 4). As the clamps start to move the arc energy is reduced by the controller 40 from its initial value toward the final value at a constant rate as the fiber is drawn thinner. During this phase the arc energy is selected to apply the minimum heat necessary to raise the fiber above its transition temperature to permit the drawing to occur. Too intense of an arc energy will result in the fiber being melted through, while too little heat will no allow the fiber to draw properly.

Figure 3A:
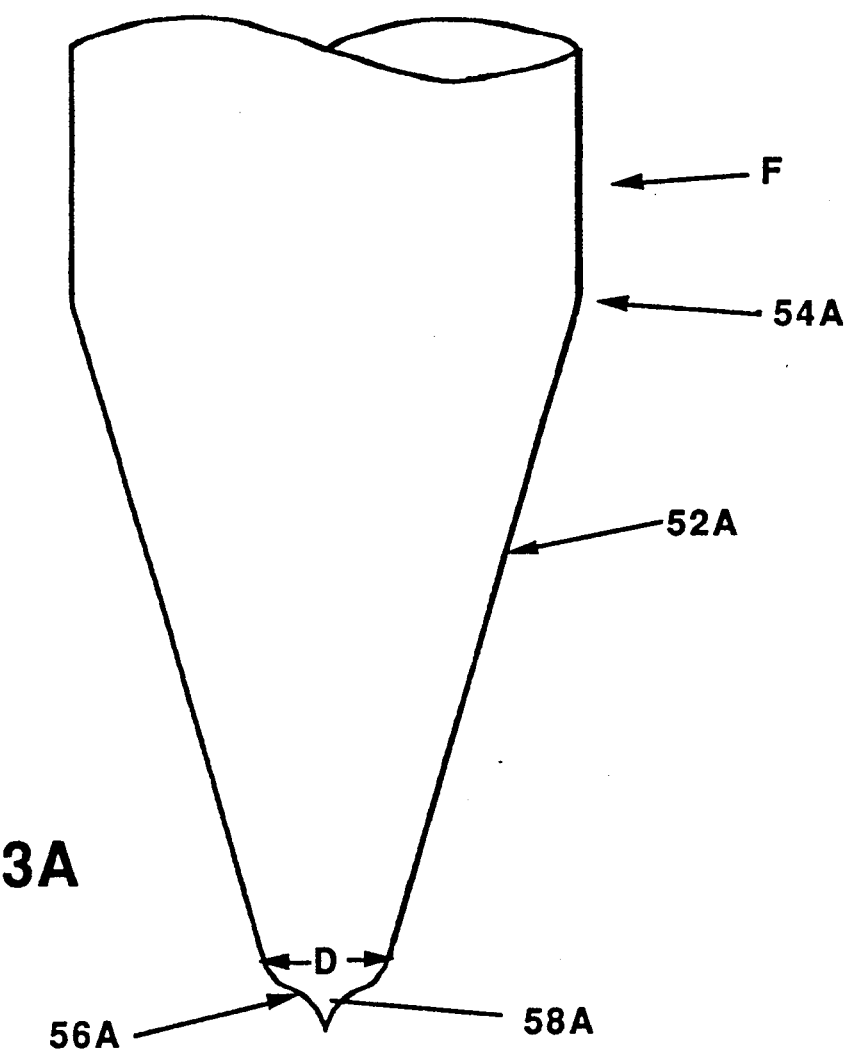
FIGS. 3A and 3B are selected enlarged views of the profile of the tip of an optical fiber shown in FIG. 2.

When the diameter dimension D (FIGS. 2 and 3A) of the fiber at the separation point S reduces to a predetermined cross-sectional dimension (found to be approximately twenty micrometers for a one-hundred-twenty-five micrometer fiber) the acceleration of the clamps 14A, 14B is stepwise increased. The stepwise increase is an abrupt change in acceleration from the initial taper acceleration to the jerk acceleration value occurs over a short time span, on the order of milli-seconds. The relative displacement of the clamps at the imposition of the jerking action is termed the taper distance and is shown graphically in FIG. 2.

The stepwise increase in acceleration results in a jerking action that is imposed on the fiber and causes the first portion 54A and the second portion 54B thereof to separate at the separation point S, as seen in FIG. 2. The jerking action sharply changes the slope of the taper, as is best seen at reference characters 56A, 56B in the FIGS. 2 and 3A. Moreover, the jerking separation of the fiber into the first and second portion pulls out a nipple-like extension 58A, 58B of material as the fiber separates into two parts.

Once the fiber is separated into the first and second portions 54A, 54B, the arc is extinguished and the working length of the fiber (i.e., the upper coiled portion C of the fiber shown in the FIG. 2) is moved back toward the plane of the arc, as indicated in FIG. 2 by the arrow 60. During this time the end of the portion 54A of the fiber F and the nipple-like extension 58A thereon are allowed to drop below the transition temperature. The duration of the cooling period, as well as the durations of all the other time periods, are shown on the graphs of FIG. 2.

Figure 3B:
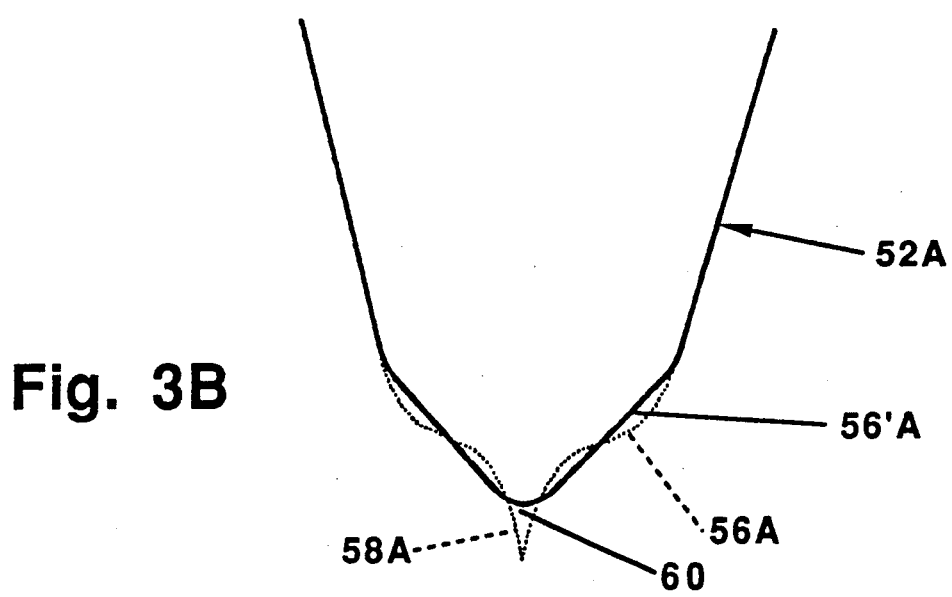

The arc is reignited and the operator, guided by the monitor 48, applies one-half second bursts of arc (at a lensing arc energy value) to the the nipple-like extension 58A on the first portion 54A of the fiber F. The application of the lensing arc softens the material in the nipple-like extension 58A to a greater extent than to the tapered portions 52A, 56A of the first portion 54A of the fiber F. The nipple-like extension 58A is thus raised above its transition temperature, and surface tension effects cause the extension 58A to withdraw upwardly (as viewed in the FIG. 2, 3A and 3B). The contraction and coalescence of the nipple-like extension 58A to form a second tapered region 56'A having a lens 60 (FIGS. 3B, 4) at the end thereof is believed best seen by comparison of FIGS. 3A and 3B.

It should be understood that the application of the lensing arc energy may be carried out under program control, and that the application of a single burst of arc (for the appropriate duration and at the appropriate energy) to form the second tapered region 56'A and the lens 60 lies within the contemplation of the invention.

The resultant lensed fiber thus formed is shown in the enlarged view in FIG. 4. The optical fiber produced as a result of the present invention has a tip having two tapered regions thereon 52A and 56'A thereon. The first tapered region 52A is disposed adjacent to the full diameter of the fiber (not visible at the scale of FIG. 4) and is characterized as being shallow in slope with respect to the axis A of the fiber. The surface of the first tapered region 52A defines a first predetermined angle 64 with respect to the axis A of the fiber F. As more precisely seen in FIG. 4 an extension of a line lying on the surface of the first tapered region 52A intersects with the axis A of the fiber at an angle 64 in the range from ten (10) to thirty (30) degrees. Preferably, the angle 64 is about eighteen (18) degrees.

The second tapered region 56'A of the tip of the fiber F is disposed immediately adjacent to the first tapered region 52A and the surface of this region is more steeply tapered with respect to the axis A of the fiber F. As noted above, this second region 56'A is produced as a result of the jerking action which separates the fiber into the first and second portions. The second tapered region 56'A is characterized in that an extension of a line lying on the surface thereof intersects with the axis A of the fiber at an angle 68 that lies within the range of thirty-five (35) to sixty (60) degrees. Preferably the angle is about forty five (45) degrees.

The second, more steeply tapered region 56'A terminates in an aspherical lens 60. The lens 60 is preferably substantially hyperbolic in section. In three dimensions, the lens 60 is preferably hyperboloidal. It should be understood that the terms "substantially hyperbolic in section" and "hyperboloidal" are meant to encompass a lens shape that deviates from being hyperbolic in section and hyperboloidal in shape and tend toward being parabolic in section and paraboloidal in three dimensional shape.

It will be recognized that the interaction of the parameters is such that a certain amount of experimentation is required to select the conditions that yield a desired configuration. The following tabulation shows a number of examples of such variation and the results achieved in terms of the average radius of the aspherical lens. "Average radius" means the radius of a circle fit by a least squares analysis to the profile of the tip of the fiber (i.e., the profile shown in FIG. 4) centered on a point X disposed approximately fifteen (15) micrometers along the axis A from the tip of the lens 60.

TABLE

| | | | |
|---|---|---|---|
| AVERAGE RADIUS (micrometers) | 8 | 10 | 14 |
| TAPER DISTANCE (micrometers) | 125 | 80 | 90 |
| INITIAL ARC (bit count) | 3000 | 2800 | 2800 |
| FINAL ARC (bit count) | 2223 | 2275 | 2350 |
| TAPER ACCEL. (micrometers/sec$^2$) | 4.6 | 10.0 | 10.0 |
| JERK ARC (bit count) | 2350 | 2355 | 2350 |
| JERK ACCEL. (micrometers/sec$^2$) | −3000 | 8000 | 8000 |

Aspherical lenses made according to the present invention exhibit superior properties (divergence angle and coupling efficiency, without significantly greater sensitivity to lateral misalignment) when compared with spherical lenses of the same average radius. While the greatest utility of this invention is believed to lie in lensing a monomode fiber, the invention can also be applied to a multimode fiber if desired. Those skilled in the art, having the benefit of the teachings of the present invention, may impart numerous modifications thereto. It should be understood that such modifications lie within the contemplation of the present invention, as defined by the appended claims.

What is claimed is:

1. An optical fiber having an axis and having a tip thereon, the tip comprising a first tapered region and a second adjacent tapered region, the second tapered region terminating in an aspherical lens, each of the tapered regions having a surface thereon, the surface of the first tapered region defining an angle with respect to the axis of the fiber that lies in the range from about ten (10) to about thirty (30) degrees, the surface of the second tapered region defining an angle with respect to the axis of the fiber that lies in the range from about thirty-five (35) to about sixty (60).

2. The fiber of claim 1 wherein the angle defined by the first tapered region is about eighteen (18) degrees.

3. The fiber of claim 2 wherein the angle defined by the second tapered region is about forty-five (45) degrees.

4. The fiber of claim 1 wherein the angle defined by the second tapered region is about forty-five (45) degrees.

5. The fiber of claim 4 wherein the aspherical lens is substantially hyperbolic in section.

6. The fiber of claim 3 wherein the aspherical lens is substantially hyperbolic in section.

7. The fiber of claim 2 wherein the aspherical lens is substantially hyperbolic in section.

8. The fiber of claim 1 wherein the aspherical lens is substantially hyperbolic in section.

9. A method of forming a tip on an optical fiber comprising the steps of:
    (a) positively clamping a length of an optical fiber at first and second spaced clamping points,
    (b) directing an energy arc at a predetermined separation point on the fiber intermediate the first and second clamping points to define with respect to the separation point a first and a second portion on the fiber,
    (c) relatively moving at least one of the clamps with respect to the other at a first predetermined separation acceleration in the presence of the energy arc thereby to define a first tapered region on at least one portion of the fiber,
    (d) stepwise increasing the separation acceleration to jerk apart the fiber and separate the first and second portions and to form a nipple-like extension on at least the portion of the fiber having the first tapered region,
    (e) cooling the portion having the nipple-like extension thereon below its transition temperature, and
    (f) thereafter introducing the nipple-like extension into the arc to form the nipple-like extension into a second tapered region having an aspherical lensed end.

10. The product produced by the process of claim 9.

* * * * *